(12) United States Patent
Lazer et al.

(10) Patent No.: US 11,755,240 B1
(45) Date of Patent: Sep. 12, 2023

(54) CONCURRENT MULTI-BIT SUBTRACTION IN ASSOCIATIVE MEMORY

(71) Applicant: GSI Technology Inc., Sunnyvale, CA (US)

(72) Inventors: Moshe Lazer, Binyamina (IL); Eyal Amiel, Rosh HaAyin (IL)

(73) Assignee: GSI Technology Inc., Sunnyvale, CA (US)

(*) Notice: Subject to any disclaimer, the term of this patent is extended or adjusted under 35 U.S.C. 154(b) by 3 days.

(21) Appl. No.: 17/678,073

(22) Filed: Feb. 23, 2022

(51) Int. Cl.
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC ......... G06F 12/0207; G06F 2207/4804; G06F 3/0604; G06F 3/0655; G06F 3/0679
USPC ............................................. 711/154; 712/22
See application file for complete search history.

(56) References Cited

U.S. PATENT DOCUMENTS

| 9,418,719 | B2 | 8/2016 | Akerib | |
|---|---|---|---|---|
| 10,402,165 | B2* | 9/2019 | Lazer | ...................... G11C 15/04 |
| 2005/0257026 | A1* | 11/2005 | Meeker | ...................... G06T 1/20 |
| | | | | 712/13 |
| 2019/0042160 | A1* | 2/2019 | Kumar | ................... G04F 10/005 |

* cited by examiner

*Primary Examiner* — Hashem Farrokh
(74) *Attorney, Agent, or Firm* — HEIDI BRUN ASSOCIATES LTD.

(57) ABSTRACT

A method for an associative memory device includes storing a plurality of pairs of multi-bit operands X and Y in rows of a memory array of the associative memory device, each pair in a different column of the memory array. Cells in a column are connected by a first bit-line providing a value of activated cells and a second bit-line providing an inverse value of the activated cells. The bits of X are stored in first rows and the bits of Y are stored in second rows. The method includes reading an inverse value of a bit stored in each of the second rows using the second bit-line, writing it to third rows and concurrently, on all columns, performing multi-bit add operations between a value of X, an inverse value of Y and a carry-in bit initiated to 1, providing the difference between X and Y in each of the columns.

8 Claims, 9 Drawing Sheets

CONCURRENT MULTI-BIT SUBTRACTION IN ASSOCIATIVE MEMORY

FIELD OF THE INVENTION

The present invention relates to associative memory generally and to a method for concurrent multi-bit subtraction, in particular.

BACKGROUND OF THE INVENTION

A ripple-borrow multi-bit subtractor, for subtracting an N-bit subtrahend Y from an N-bit minuend X is constructed from N one-bit full subtractors operated from right to left.

FIG. 1, to which reference is now made, illustrates a one-bit full subtractor 10 and a multi-bit ripple carry subtractor 12 to subtract multi-bit subtrahend Y from multi-bit minuend X, constructed from a plurality of full subtractor 10. Both one-bit full subtractor 10 and multi-bit ripple carry subtractor 12 are known in the art. Each one-bit full subtractor 10, located in position i on multi-bit ripple carry subtractor 12, receives as input a bit xi from variable X, a bit $y_i$ from variable Y and a borrow-in bit, $b_{in\text{-}i}$ which is the borrow-out bit ($b_{out\text{-}i\text{-}1}$) created by the previous full subtractor 10, located at location i−1.

An N-bit subtractor subtracts an N-bit subtrahend Y from an N-bit minuend X to provide a difference according to Equation 1:

$$X - Y = D$$

It may be appreciated that the difference between the minuend and the subtrahend may be computed by adding the inverse value of the subtrahend to the minuend (X+(−Y)), therefore a multi-bit ripple carry adder may be used to implement a ripple carry multi-bit subtractor.

FIG. 2, to which reference is now made, illustrates a one-bit full adder 20 and a multi-bit ripple carry adder 22 to add two multi-bits operands A and B, constructed from a plurality of full adders 20, known in the art. One-bit full adder 20, receives three one-bit values as input, a, b, and $c_{in}$, and adds them. The output of one-bit full adder 20 is a calculated sum s of the three input bits and a bit $c_{out}$ carried out from the add operation. Each one-bit full adder 20, located in position i on multi-bit ripple carry adder 22, receives as input a bit $a_i$ from variable A, a bit $b_i$ from variable B and a carry-in bit, $c_{in\text{-}i}$ which is the carry-out bit ($c_{out\text{-}i\text{-}1}$) created by the previous full adder 20, located at location i−1. The multi-bit add operation is expressed by equation 2:

$$A + B + 0 = S + c_{out} \qquad \text{Equation 2}$$

It may be noted that the carry-in bit is zero (i.e., the first step of the add operation has no carry as there is no previous step that could generate one). The functionality of a full adder implementing a full subtractor is expressed by equation 3:

$$X + (-Y) + 0 = S + c_{out} \qquad \text{Equation 3}$$

It may be appreciated that a ripple-borrow subtractor may get slow when subtracting large multi-bit values. The entire ripple-borrow computation is serial, and its complexity is O(N). Using a multi-bit adder to implement subtraction will worsen the complexity since the computational complexity of the additional computation needed to invert the value of the subtrahend to add it to the minuend (equation 3) may also be O(N).

SUMMARY OF THE PRESENT INVENTION

There is provided, in accordance with a preferred embodiment of the present invention, a method for an associative memory device. The method includes storing a plurality of pairs of multi-bit operands X and Y in rows of a memory array of the associative memory device, each pair in a different column of the memory array, and cells in a column connected by a first bit-line providing a value of activated cells and a second bit-line providing an inverse value of the activated cells, bits of X in first rows and bits of Y in second rows. The method also includes reading an inverse value of a bit stored in each of the second rows using the second bit-line and writing the inverse value to third rows. The method also includes concurrently, on all columns, performing multi-bit add operations between a value of X, an inverse value of Y and a carry-in bit initiated to 1, thereby providing a difference between X and Y in each of the columns.

Additionally, in accordance with a preferred embodiment of the present invention, the step of storing a pair of the plurality of pairs of multi-bit operands includes storing associated bits of X and Y, $x_j$ and $y_j$ in a first and a second rows of a same section of the memory array.

Moreover, in accordance with a preferred embodiment of the present invention, the performing step includes dividing the sections to groups and concurrently on all columns, computing a first carry-out from each group assuming that a value of a carry-in to all groups is 1, and storing the first predicted carry-out values in a third row of a last section of each group. In addition, the performing step also includes concurrently on all columns, computing a second carry-out from each group assuming that a value of a carry-in to all groups is 0, and storing the second predicted carry-out values in a fourth row of the last section of each the groups. In addition, the performing step also includes concurrently on all columns, selecting the first-predicted carry-out or the second-predicted carry-out, according to an actual carry-out of a previous group, to provide a final carry-out.

Furthermore, in accordance with a preferred embodiment of the present invention, the performing step includes concurrently on all columns, setting the value of the carry-in to all first groups to one.

Still furthermore, in accordance with a preferred embodiment of the present invention, the computing step includes utilizing per-column Boolean operations on bits stored in a plurality of rows of each section to provide the first-predicted carry-out and the second-predicted carry-out of each group and utilizing per-column Boolean operations on bits stored in a plurality of rows of each section to provide a sum and a final carry-out.

There is provided, in accordance with a preferred embodiment of the present invention, a system that includes a non-destructive associative memory array of cells arranged in sections, each section includes rows and columns, wherein cells in a column in a section are connected by a first bit-line providing a value of cell and a second bit-line providing the inverse value of a cell. Each section in the associative memory array is capable of providing a result of a Boolean operation between values stored in cells connected by the first bit line or a result of a Boolean operation between values in cells connected by the second bit-line. The system also includes a fast subtractor to, in parallel, perform a multi-bit add operation on a value of the first multi-bit number, an inverse value of the second multi-bit number and a carry-in bit initialized to one.

Additionally, in accordance with a preferred embodiment of the present invention, the associated bits of a pair of the plurality of pairs of multi-bit numbers are stored in a same section.

Moreover, in accordance with a preferred embodiment of the present invention the fast subtractor also includes a predictor, operative in parallel on the columns in the memory array, to generally concurrently predict a plurality of carry out values, the predictor performs per-column Boolean operations on cells in a section; The fast subtractor also includes a selector, which operates on the columns in the memory array, to select one of the predicted carry out values in all sections. The fast subtractor also includes a summer, which operates on the columns in the memory array, to generally concurrently, for all bits, calculate a sum of the multi-bit numbers using the selected carry-out values.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
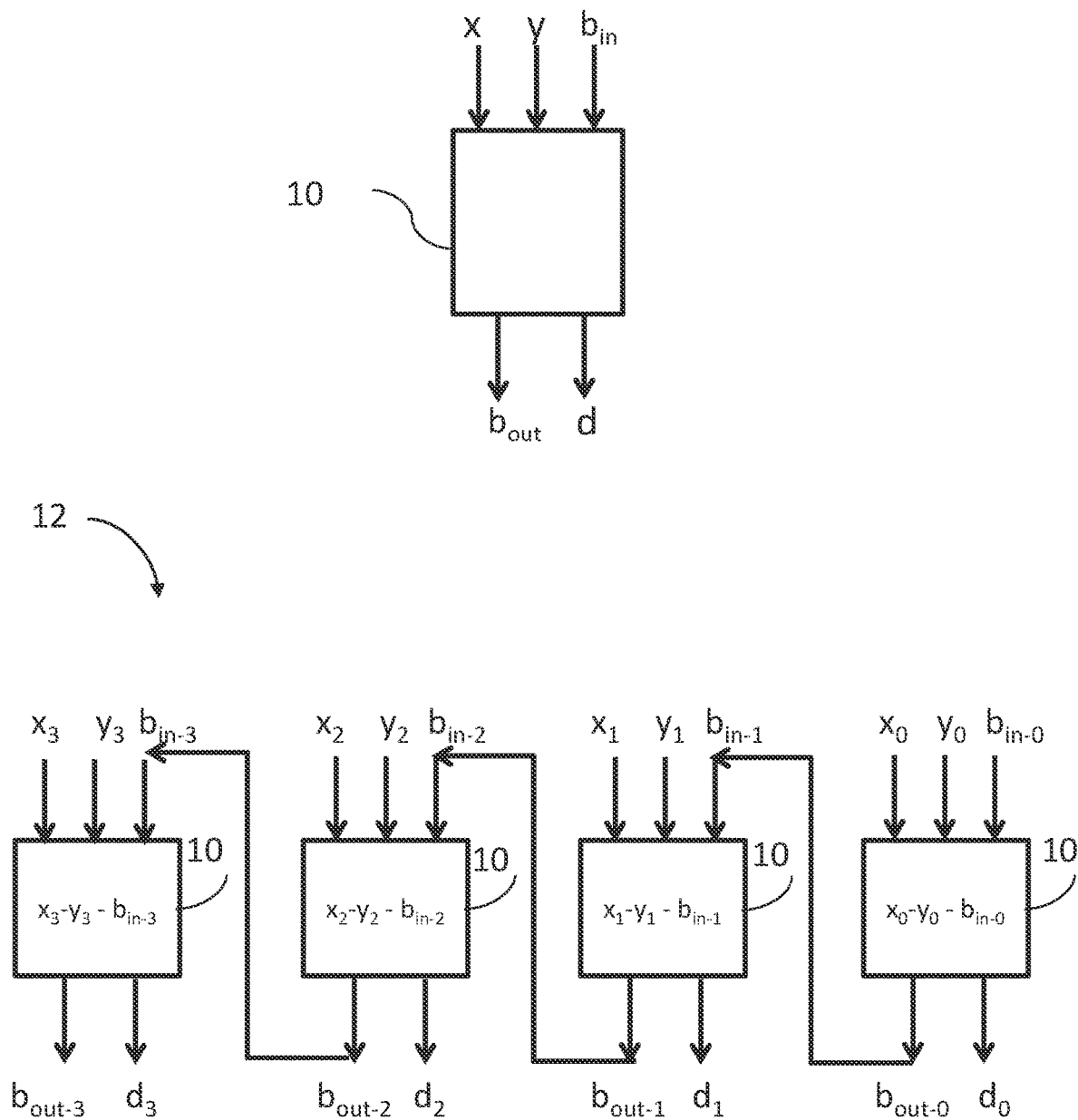
FIG. 1 is a schematic illustration of a one-bit full subtractor and a multi-bit ripple carry subtractor known in the art.
Figure 2:
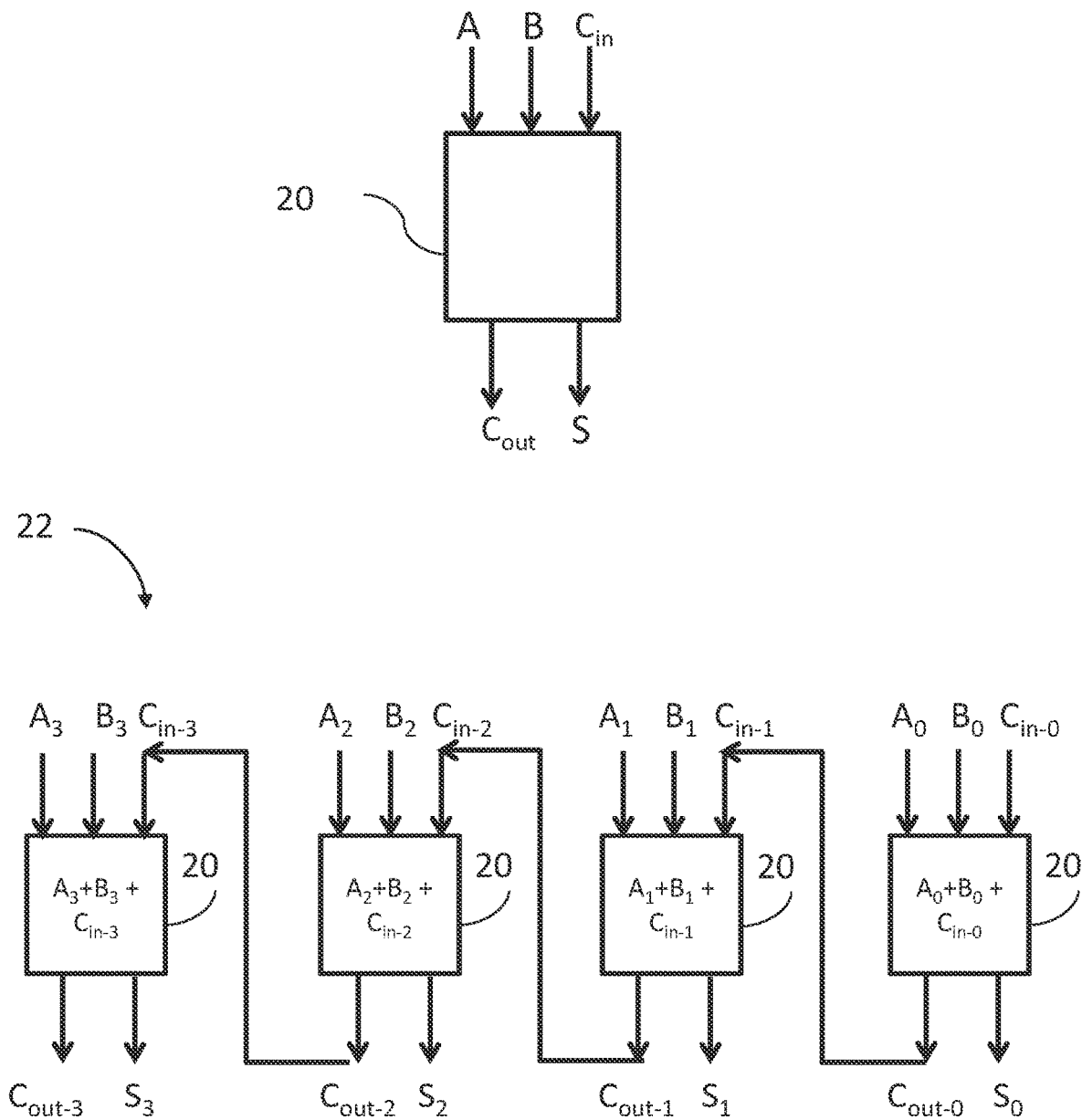
FIG. 2 is a schematic illustration of a one-bit full adder and a multi-bit ripple carry adder that may be used for subtracting two multi-bits operands also known in the art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

When using a full adder for subtraction, the subtrahend (Y) should first be replaced by its inverse value (−Y), prior to its being passed to the full adder as input. The inverse value of the subtrahend can be obtained by computing its two's complement value, i.e., by obtaining the "NOT" value of all its bits and adding one as expressed in equation 4:

$$-Y = (\sim Y) + 1 \qquad \text{Equation 4}$$

where ~Y indicates the complement of Y.

Applicant has realized that the inverse value of bits may be obtained without any computation in a device like the one described in U.S. Pat. No. 9,558,812 (entitled "SRAM multi-cell operations") commonly owned by Applicant and incorporated herein by reference; therefore the inverse step when computing the two's complement representation may be obtained in a complexity of O(1) without any additional computation steps.

As mentioned herein, a multi-bit adder receives 2 multi-bit numbers and a first carry-in bit that equals zero and computes the sum. A full adder that receives a first multi-bit number, the inverse values of the bits of a second multi-bit number and a first carry-in bit that equals to one (as opposed to zero) essentially receives a minuend in the first multi-bit number and the two's complement representation of a subtrahend in the second multi-bit number with the first carry-in bit and implements a multi-bit subtractor. This way of implementing a multi-bit subtract functionality using a multi-bit adder, is expressed in equation 5 (which is the equivalent of equation 3).

$$X + (\sim Y) + 1 = S + c_{out} \qquad \text{Equation 5}$$

Applicant has further realized that using a memory device, like the one described in U.S. Pat. No. 9,418,719 (entitled "IN-MEMORY COMPUTATIONAL DEVICE") commonly owned by Applicant and incorporated herein by reference, may be advantageously used for performing a concurrent subtract operation on a large number M of pairs of numbers with a resulting complexity of O(N). Such a device uses a bit-line processor for each pair of N-bit numbers and, as a result, the complexity depends on the number of bits (N) in the minuend and the subtrahend and not on the number M of pairs of N-bit numbers.

Applicant has also realized that the complexity of a multi-bit subtract operation which uses a multi-bit adder may be further improved by concurrently performing computation steps on several bits of each minuend subtrahend pair in parallel, as described in U.S. Pat. No. 10,402,165 (entitled "CONCURRENT MULTI-BIT ADDER), commonly owned by Applicant and incorporated herein by reference. Applicant has realized that splitting each pair of N-bit operands to G groups of bits (e.g., 32-bit operands may each be split to 8 groups of 4 bits each) and performing steps of the computation concurrently on all G groups of the same pair, may reduce the complexity of the multi-bit subtract operation to O(N/G).

Figure 3:
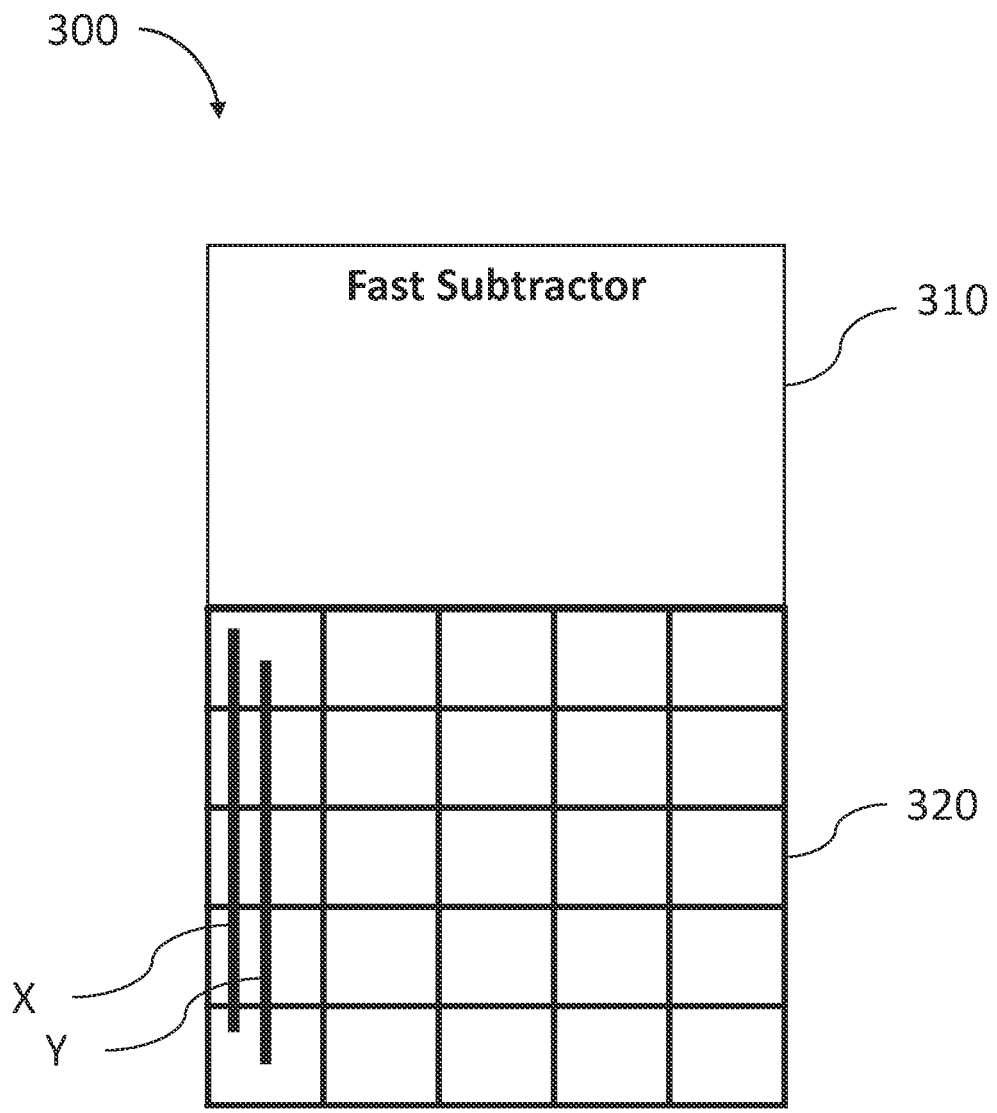
FIG. 3 is a schematic illustration of a concurrent multi-bit subtractor constructed and operative in accordance with a preferred embodiment of the present invention.

FIG. 3 to which reference is now made, schematically illustrates a concurrent multi-bit subtractor 300, constructed and operative in accordance with an embodiment of the present invention. Concurrent multi-bit subtractor 300 comprises a fast subtractor 310 and an associative memory array 320.

Fast subtractor 310 may perform a ripple carry add operation between minuend X, the inverse value of subtrahend Y (automatically available in associative memory array 320 storing subtrahend Y and may be written into a new row during the first read operation) and a first carry-in initiated to 1, all stored in associative memory array 320.

Figure 4:
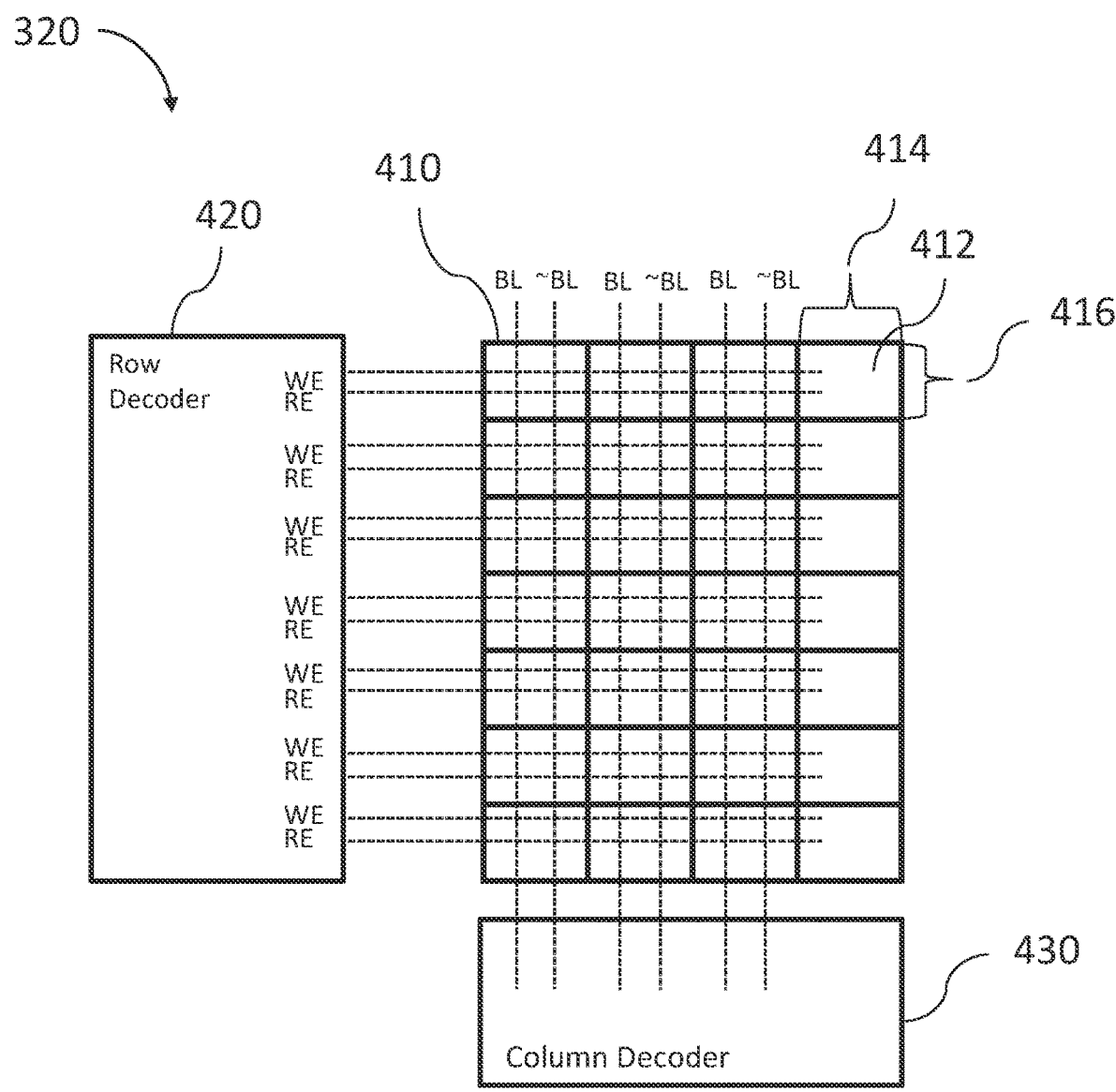
FIG. 4 is a schematic illustration of an associative memory array used by the concurrent multi-bit subtractor of FIG. 3, constructed and operative in accordance with a preferred embodiment of the present invention.

FIG. 4, to which reference is now made, is a schematic illustration of associative memory array 320. Associative memory array 320 comprises a memory array 410, a row decoder 420 and a column decoder 430.

Memory array 410 comprises a plurality of cells 412 arranged in a matrix of rows 416 and columns 414. All cells 412 in the same column 414 are connected to the same pair of bit-lines BL and ~BL, where bit line ~BL receives the complement value of whatever bit line BL receives. All cells 412 in the same row 416 are connected to the same read enable (RE) line and to the same write enable (WE) line.

Row decoder 420 comprises a plurality of read enabled (RE) lines and write enabled (WE) lines and may select multiple rows 416 for reading and multiple rows 416 for writing. Row decoder 420 may select rows 416 for reading by activating the corresponding RE lines. The row selection for reading may be performed by charging the relevant RE lines. Several RE lines may be activated simultaneously, enabling a multi read operation. Row decoder 420 may select a row 416 for writing by activating the corresponding WE line. Several WE lines may be activated simultaneously, enabling multi-write operations. Row decoder 420 may select rows 416 for writing by charging the relevant WE lines.

Column decoder 430 may control the selection of column 414 by pre-charging and/or charging bit lines BL or ~BL of the selected columns 414 with the appropriate voltage according to the relevant operation: read or write. Column decoder 430 may select to activate bit-line BL or bit-line ~BL of columns 414 therefore get the value of cell 412 or the inverse value of the cell 412.

It may be appreciated that associative memory array 320 may concurrently perform a read and a write operation therefore it may read an inverse value of a cell 412 in one cycle and write the value into a new cell 412 in a next cycle.

Figure 5:
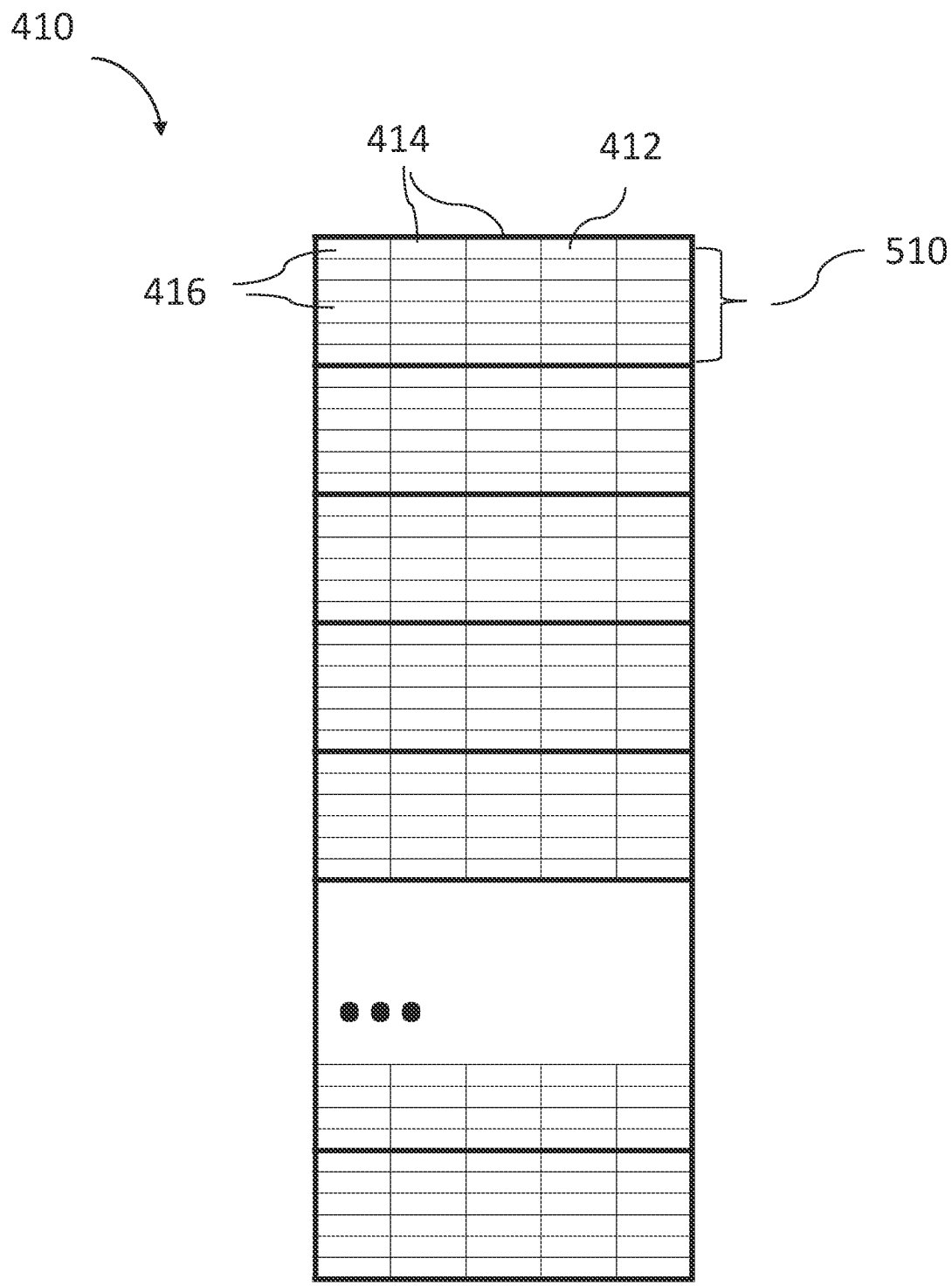
FIG. 5 is a schematic illustration of the arrangement of cells in the associative memory array of FIG. 4 constructed and operative in accordance with an embodiment of the present invention.

FIG. 5, to which reference is now made, schematically illustrates the arrangement of memory array 410. Memory array 410 may be divided to a plurality of sections 510, where each section 510 comprises a plurality of cells 412 arranged in a plurality of rows 416 and a plurality of columns 414. Operands may be stored in columns 414 and a subtract operation may be performed per column 414. Multi-bit subtractor 300 may simultaneously perform the same logic on several sections 510, reducing the number of cycles in each subtract computation. Each column 414 may be used to perform a concurrent multi-bit subtraction between minuend X and subtrahend Y and each section 510 may be used to handle a single specific bit (bit k) of minuend X and subtrahend Y.

Multi-bit subtractor 300 may store multiple pairs of operands X and Y in associative memory array 410, each pair in a different column. Multi-bit subtractor 300 may store each pair of bits (one from minuend X and the other from subtrahend Y), referred herein as associated bits, in a separate section 510 and may perform concurrent multi-bit subtract operations on a plurality of columns (a subtract operation per column). The ability of multi-bit subtractor 300 to concurrently perform logic on multiple sections of each column may parallelize steps of the multi-bit subtract operation on each column and may reduce the computation cycles for each multi-bit subtract operation.

Figure 6:
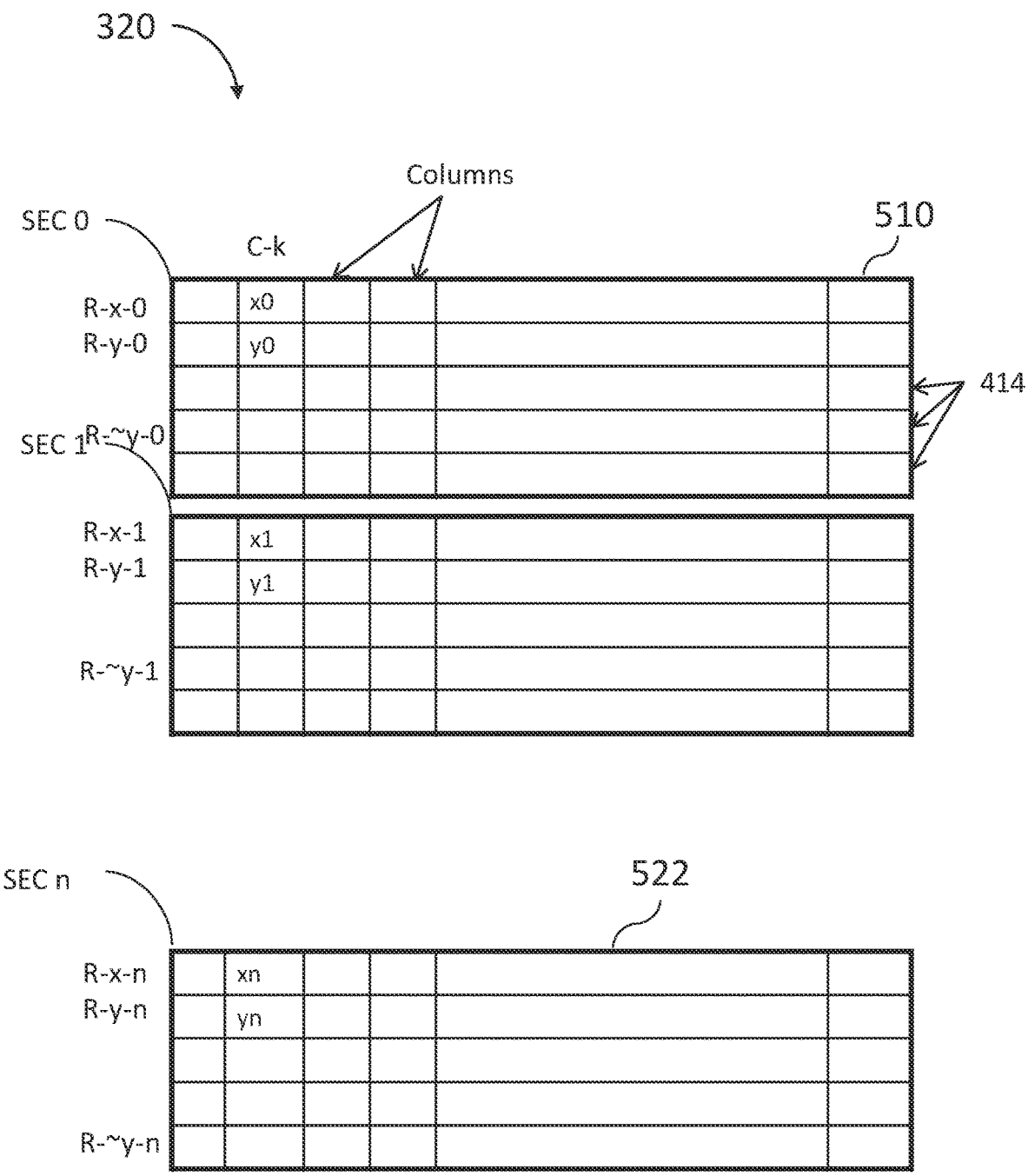
FIG. 6 is a schematic illustration of the placement of each pair of operands X and Y in a column of associative memory in accordance with an embodiment of the present invention.

FIG. 6, to which reference is now made, is a schematic illustration of the placement of each pair of operands X and Y in a column of associative memory array 320. Multi-bit subtractor 300 may store bits of minuend X in a column C of an associative memory, each bit j in a first row of a section j, and bits of subtrahend Y in the same column C, each bit j in a second row of section j. Specifically, multi-bit subtractor 300 may store each bit j of a pair k of operands X and Y in a column c-k. Multi-bit subtractor 300 may store bit $x_j$ from operand X in row R-x-j of section j and bit $y_j$ from operand Y in row R-y-j of section j. For example, bit xo may be stored in row R-x-0 in column C-k of section 0, and bit $y_0$ of operand Y may be stored in row R-y-0, in the same column C-k of the same section 0. The other bits of operands X and Y may be similarly stored in additional sections 522 of associative memory array 320. It may be appreciated that the built-in capabilities of associative memory array 320, may enable multi-bit subtractor 300 to read an inverse value of a cell in one cycle and write it to a different row of the section in the next cycle. For example, the inverse value of a cell stored in row R-y-j can be read for performing a computation and at the next cycle it may be written back to row R-~y-j. By performing this write operation, multi-bit subtractor 300 may use the inverse value of a cell in a Boolean operation performed on a bit-line processor.

Each section j may include bit xi from variable X, bit $y_i$ from variable Y, and a carry-in bit $c_{in\ i}$ (which is the carry-out bit from the previous section $c_{out\ i-1}$). The value of the carry-in to the first section (handling the LSB) may be initialized to 1. Multi-bit subtractor 300 may use additional rows 416 of each section 522 for intermediate computation and storage, for example, for storing inverse value, carry-in, carry-out and sum bits and intermediate computation results.

Figure 7:
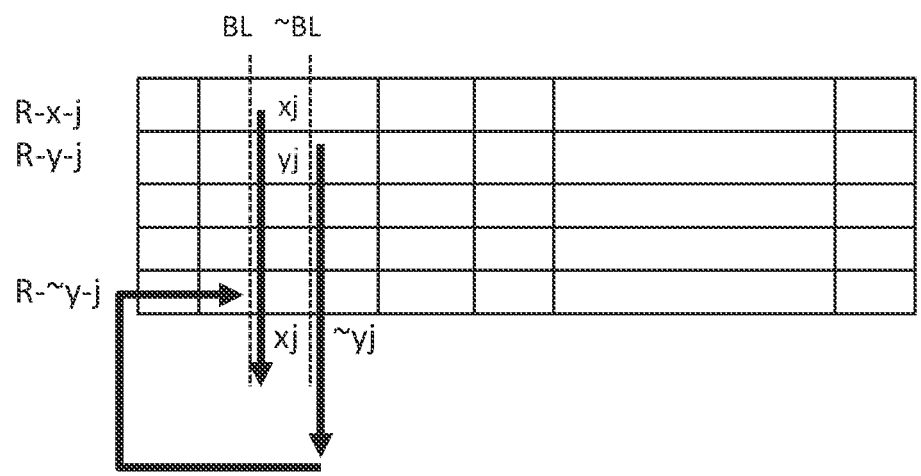
FIG. 7 is a schematic illustration of the usage of either the value of a cell (for the minuend), or the inverse value of a cell (for the subtrahend) by concurrent multi-bit subtractor constructed and operative in accordance with an embodiment of the present invention.

FIG. 7, to which reference is now made, is a schematic illustration of the usage of either the value of a cell (for the minuend), or the inverse value of a cell (for the subtrahend) needed for the subtract operation. In a first step, fast subtractor 310 may read an inverse value ~y-j from row R-y-j using bit-line ~BL for performing a computation in one cycle and write it to a row R-~y-j in the next cycle (it may be appreciated that the write operation may be performed while performing the next reading operation needed for the next step of the computation thanks to the ability of associative memory array 320 to simultaneously read a value from one cell and write a value to another cell). In every other step of the computation, fast subtractor 310 (FIG. 3) may concurrently activate row R-x-j and R-~y-j to perform computations on the inverse value of the cell essentially, operating on the values of $x_j$ and $~y_j$. It may be appreciated that multi-bit concurrent subtractor 300 operates concurrently on all columns, thereby providing concurrent subtract calculations.

It may be appreciated that the value of ~y of all bits of subtrahend Y may be written to a new row R-~y-j in beginning of the computation (that includes 2 cycles, one to read the inverse value from a cell and one to write it to another cell) of the procedure and therefore may not add complexity to the computation.

Figure 8:
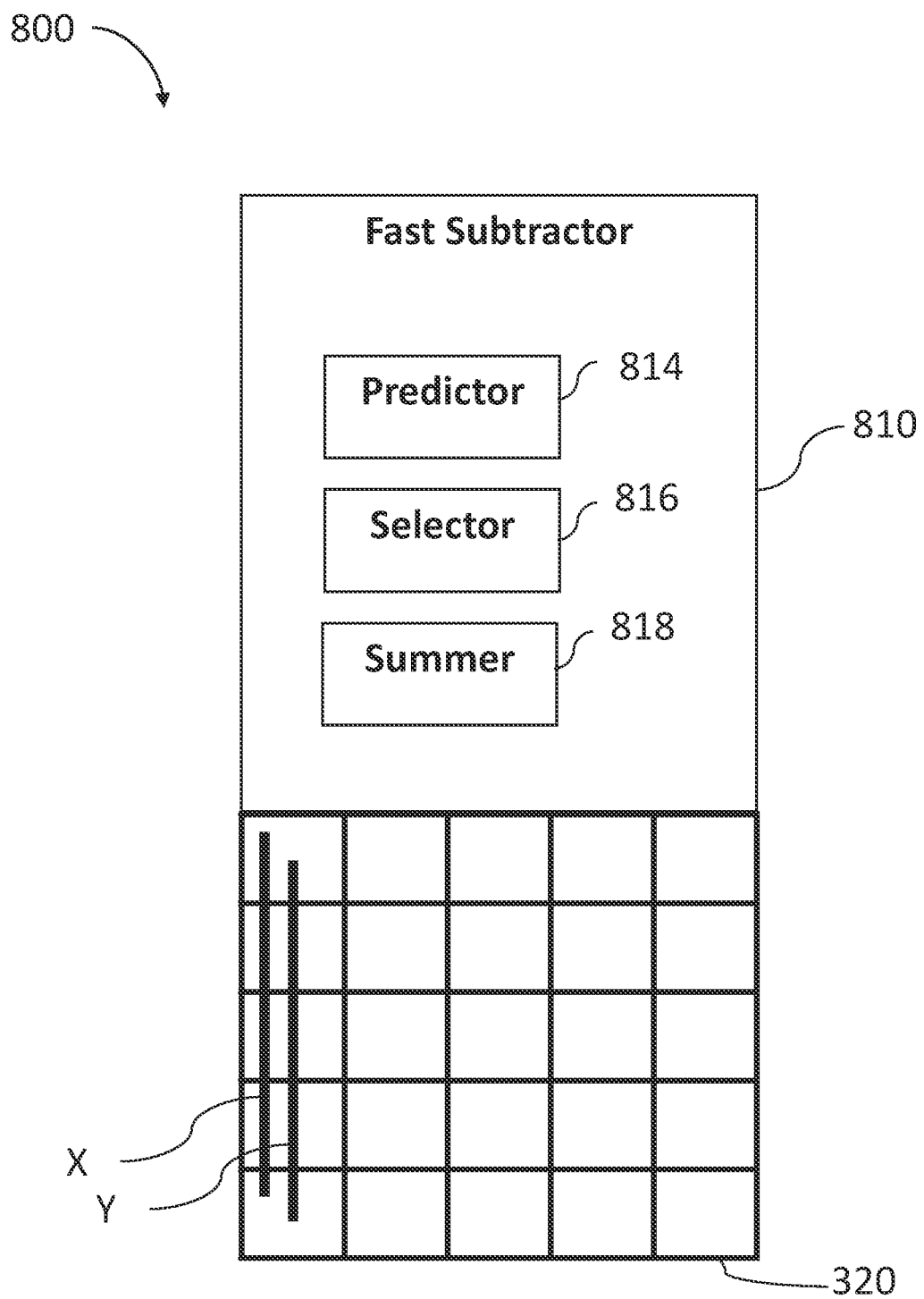
FIG. 8 is a schematic illustration of multi-bit concurrent subtractor constructed and operative in accordance with an alternative embodiment of the present invention.

FIG. 8, to which reference is now made, schematically illustrates an alternative embodiment of multi-bit concurrent subtractor, here labeled 800, constructed and operative in accordance with a preferred embodiment of the present invention. Multi-bit concurrent subtractor 800 comprises a fast subtractor 810 and an associative memory array 320. Fast subtractor 810 comprises a predictor 814, a selector 816 and a summer 818.

Fast subtractor 810 may split each pair of multi-bit numbers into groups of a known size and may implement a functionality like carry-look-ahead in the associative memory to improve the computation efficiency of multi-bit concurrent subtractor 800.

Fast subtractor 810 may concurrently perform the same logic on several sections 510( ) which may reduce the total number of cycles needed for each multi-bit subtract operation. Fast subtractor 810 may conceptually divide sections 510 to G groups and may perform some steps of a multi-bit subtract operation on each group separately, as described in detail with regards to FIG. 9 herein below.

Predictor 814 may predict the value of the carry-in to each group, since the carry-in to each group is unknown, except for the carry to the first group, which is 1 to complete the two's complement computation. Selector 816 may select the actual carry-in when available and summer 818 may compute the sum after an actual value of the carry-in is selected. Fast subtractor 810 may concurrently perform computation steps on all groups, which may reduce the overall computation time of each subtract operation.

Figure 9:
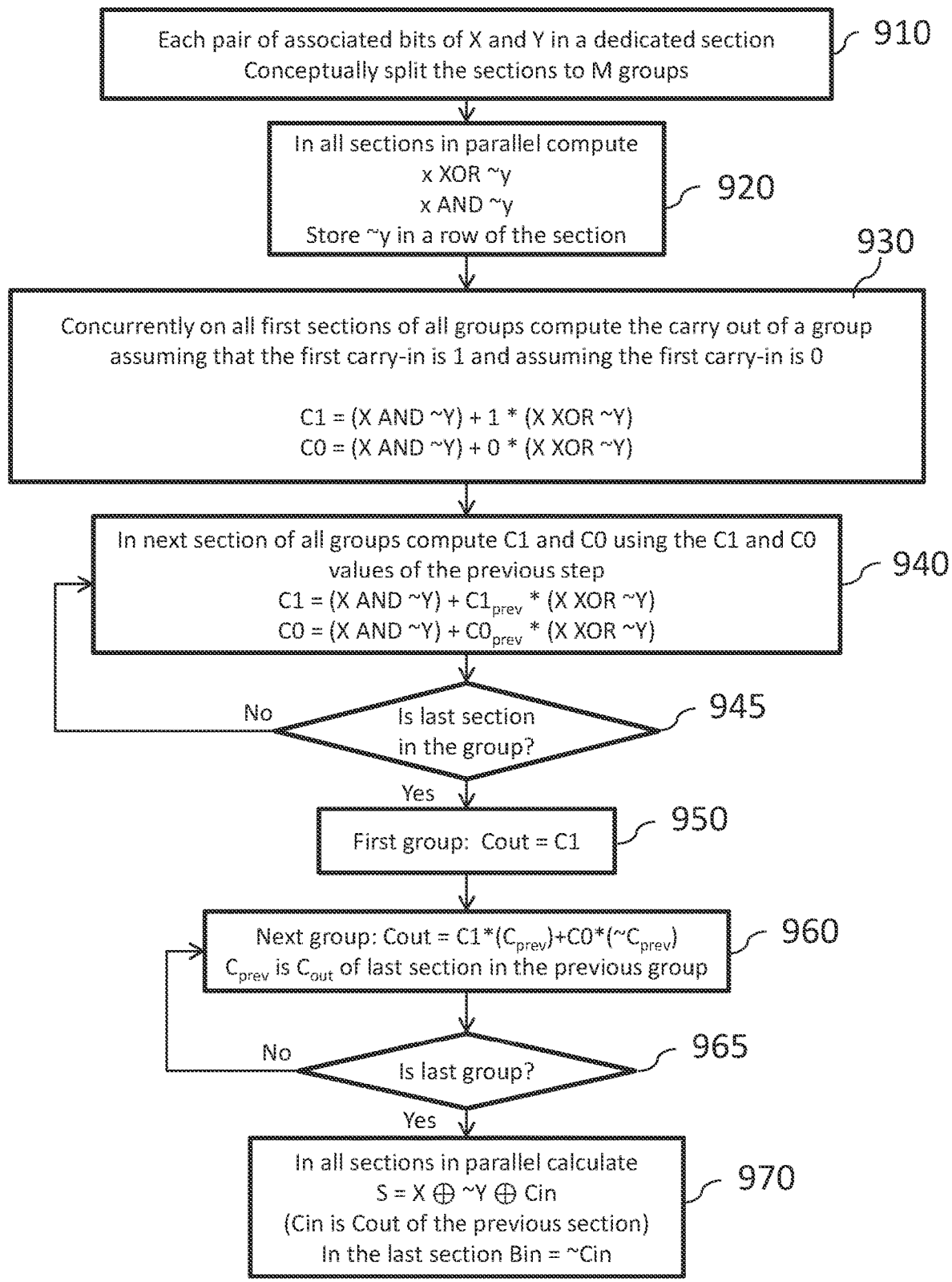
FIG. 9 is a flow chart describing the steps that the alternative embodiment of concurrent multi-bit subtractor of FIG. 8 perform for subtracting subtrahend Y from minuend X in accordance with an embodiment of the present invention.

FIG. 9, to which reference is now made, is a flow chart describing the steps that multi-bit concurrent subtractor 800 may perform for subtracting subtrahend Y from minuend X in a computational complexity O(N/M). It may be appreciated that multi-bit concurrent subtractor 800 may concurrently perform the same flow on multiple pairs of subtrahend Y and minuend X, stored in different columns, to concurrently compute multiple subtract operations, one subtraction operation per column.

In step 910, multi-bit concurrent subtractor 800 may reactive a plurality of pairs of operands (X and Y) and may store each pair of associated bits of minuend X and subtrahend Y in different rows 416, in a same column 414 in a section 510 of memory array 320.

In step 920, fast subtractor 810 may concurrently compute the Boolean XOR between bits of minuend X and the inverse value of bits of subtrahend Y and may store the inverse value of the bits from the minuend in a new row 416 in all sections 510 and the Boolean AND between bits of minuend X and the inverse value of bits of subtrahend Y stored in the new row in all sections 510 and may store intermediate results in available rows of the sections.

In steps 930, predictor 814 may compute in parallel the carry-out of each first section of each group in each column for each possible value of the carry-in to the group. i.e., predictor 814 may concurrently on all first sections of all groups compute the carry-out of a group assuming that the first carry-in is 1 and then assuming the first carry-in is 0. The computed carry-out may be stored in available rows of the sections.

In step 940, predictor 814 may compute the carry-out of the next section of each group using any possible value of the carry-out of the previous group as the carry-in to the next section.

In step 945, fast subtractor 810 may check if all the sections have been handled. If there are sections for which the carry-out was not computed, fast subtractor 810 may return to step 940 to compute the carry-out for that section. Otherwise, fast subtractor 810 may continue to step 950.

In step 950, selector 816 may select the carry-out of the first group computed assuming the carry-in is 1 and may continue to compute the actual carry-out of each group in the next step.

In step 960, selector 816 may select the carry-out of the next group using the correct value of the carry-out of the previous group until the carry-out of the last group is computed.

In step 965, fast subtractor 810 may check if all groups have been handled. If not, fast subtractor 810 may return to step 960 to compute the carry-out of the next group. Otherwise, fast subtractor 810 may continue to step 970.

In step 970, summer 818 may concurrently in all sections compute the sum of the associated bits using the correct carry-out of a previous group as a carry-in to each next group.

It may be appreciated that the steps shown for the flows herein above are not intended to be limiting and that each flow may be practiced with variations. These variations may include more steps, less steps, changing the sequence of steps, skipping steps, among other variations which may be evident to one skilled in the art.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for an associative memory device, the method comprising:
    storing a plurality of pairs of multi-bit operands X and Y in rows of a memory array of said associative memory device, each pair in a different column of said memory array;
    cells in a column connected by a first bit-line providing a value of activated cells and a second bit-line providing an inverse value of said activated cells, bits of X in first rows and bits of Y in second rows;
    reading an inverse value of a bit stored in each of said second rows using said second bit-line and writing said inverse value to third rows; and
    concurrently, on all columns, performing multi-bit add operations between a value of X, an inverse value of Y and a carry-in bit initiated to 1, thereby providing a difference between X and Y in each of said columns.

2. The method of claim 1 wherein said storing a pair of said plurality of pairs of multi-bit operands comprises:
    storing associated bits of X and Y, $x_j$ and $y_j$ in a first and a second row of a same section of said memory array.

3. The method of claim 2 wherein said performing also comprises:
    dividing said sections to groups;
    concurrently on all columns, computing a first carry-out from each group assuming that a value of a carry-in to all said groups is 1, and storing first predicted carry-out values in a third row of a last section of each said groups;
    concurrently on all columns, computing a second carry-out from each group assuming that a value of a carry-in to all said groups is 0, and storing second predicted carry-out values in a fourth row of said last section of each said groups;

concurrently on all columns, selecting one of: said first predicted carry-out and said second predicted carry-out, according to an actual carry-out of a previous group, to provide a final carry-out.

4. The method of claim 3 wherein said performing also comprises:
concurrently on all columns, setting the value of the carry-in to all first groups to one.

5. The method of claim 4 wherein said computing also comprises:
utilizing per-column Boolean operations on bits stored in a plurality of rows of each said section to provide said first-predicted carry-out and said second predicted carry-out of each group; and
utilizing per-column Boolean operations on bits stored in a plurality of rows of each said section to provide a sum and a final carry-out.

6. A system comprising:
a non-destructive associative memory array of cells arranged in sections, each section comprising rows and columns, wherein cells in a column in a section are connected by a first bit-line providing a value of cell and a second bit-line providing the inverse value of a cell, each said section capable of providing a result of a Boolean operation between values stored in cells connected by said first bit line or a result of a Boolean operation between values in cells connected by said second bit-line; and
a fast subtractor to, in parallel, perform a multi-bit add operation on a value of a first multi-bit number, an inverse value of a second multi-bit number and a carry-in bit initialized to one.

7. The system of claim 6 and wherein associated bits of a pair of said multi-bit numbers are stored in a same section.

8. The system of claim 7 wherein said fast subtractor also comprising:
a predictor, operative in parallel on said columns in said memory array, to generally concurrently predict a plurality of carry out values, said predictor performing per-column Boolean operations on cells in a section;
a selector, operative on said columns in said memory array, to select one of said predicted carry out values in all sections; and
a summer, operative on said columns in said memory array, to generally concurrently, for all bits, calculate a sum of said multi-bit numbers using said selected carry-out values.

\* \* \* \* \*